United States Patent [19]

Gruner et al.

[11] Patent Number: 4,731,734

[45] Date of Patent: Mar. 15, 1988

[54] DIGITAL COMPUTER SYSTEM INCORPORATING OBJECT-BASED ADDRESSING AND ACCESS CONTROL AND TABLES DEFINING DERIVATION OF ADDRESSES OF DATA FROM OPERANDS IN INSTRUCTIONS

[75] Inventors: Ronald H. Gruner, Cary, N.C.; Gerald F. Clancy, Saratoga, Calif.; Craig J. Mundie, Cary; Stephen I. Schleimer, Chapel Hill, both of N.C.; Steven J. Wallach, Saratoga, Calif.; Richard G. Bratt, Wayland; Edward S. Gavrin, Lincoln, both of Mass.; Walter A. Wallach, Jr., Raleigh, N.C.; John K. Ahlstrom, Mountain View, Calif.; Michael S. Richmond, Pittsboro, N.C.; David H. Bernstein, Ashland, Mass.

[73] Assignee: Data General Corporation, Westboro, Mass.

[21] Appl. No.: 830,480

[22] Filed: Feb. 14, 1986

Related U.S. Application Data

[63] Continuation of Ser. No. 542,088, Oct. 17, 1983, abandoned, which is a continuation of Ser. No. 266,410, May 22, 1981, abandoned.

[51] Int. Cl.[4] ............................................. G06F 9/30
[52] U.S. Cl. .................................................. 364/200
[58] Field of Search ... 364/200 MS File, 900 MS File

[56] References Cited

U.S. PATENT DOCUMENTS 4,025,901  5/1977  Bachman et al. ............... 364/200
4,320,451  3/1982  Bachman et al. ............... 364/200

OTHER PUBLICATIONS

Donovan, *System Programming*, 1972, Chapter 9, pp. 349-432.
Clingen et al., "The Maltics Virtual Memory, Concepts and Design", Communication of the ACM, May 72, vol. 15, #5.

*Primary Examiner*—Eddie P. Chan
*Attorney, Agent, or Firm*—Robert F. O'Connell

[57] ABSTRACT

A digital computer system having a memory system organized into objects for storing data and a processor for processing data in response to instructions. An object identifier and an access control list are associated with each object. The memory system responds to logical addresses for data which specify the object containing the data and the offset of the data in the object and to a current subject for which the processor is referencing the data. The memory system performs a memory operation for the processor only if the access control list for the object specified by the logical address allows the current subject to perform the desired memory operation. The objects include procedure objects and data objects. The procedure objects contain procedures including the instructions and name tables associated with the procedures. The instructions contain operations codes and names representing data. Each name corresponds to a name table entry in the name table associated with the procedure. The name table for a name contains information from which the processor may derive the logical address for the data represented by the name. The processor may then use the logical address to specify a memory operation on the data represented by the name.

16 Claims, 1 Drawing Figure

DIGITAL COMPUTER SYSTEM INCORPORATING OBJECT-BASED ADDRESSING AND ACCESS CONTROL AND TABLES DEFINING DERIVATION OF ADDRESSES OF DATA FROM OPERANDS IN INSTRUCTIONS

This is a continuation of application Ser. No. 542,088, filed Oct. 17, 1983, now abandoned, which is a continuation of application Ser. No. 266,410, filed May 22, 1981, now abandoned.

CROSS REFERENCE TO RELATED APPLICATIONS

The present patent application is related to U.S. patent application Ser. No. 266,426 now U.S. Pat. No. 4,575,797 assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structureof the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN and COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing object-based addressing of data. The digital computer system of the present invention includes a memory system including mass storage devices and one or more processors connected to the memory system.

The memory system is organized into objects containing data items. Each object is identified by an object identifier. Locations of data items in the memory system are specified by means of the object identifier for the object containing the data item and an offset specifying the bit at which the data item begins in the object.

Access to the data items in the object is controlled. When the digital computer system processes data in an object, it does so for a subject representing an entity using the computer system. An access control list associated with each object defines sets of subjects and a set of memory operations which a subject in a given set of subjects may perform on data items in the object. A memory operation on a data item in an object succeeds only if there is an access cntrol list entry associated with the object which allows the subject for whom the processor is performing the memory operation to perform that operation on the data in the object.

The data items include instructions which are executable by the processor. In the instructions, operands are represented by names. Each name in a procedure corresponds to a name table entry. Data in the name table entry corresponding to a name specifies how the processor is to derive the logical address of the operand represented by the name.

The memory system responds to a memory operation specifier consisting of a memory command specifying a memory operation such as read data or write data, a logical address containing a representation of an object identifier, an offset, and a length in bits and to a value representing the subject for which the processor is currently executing a procedure. In response to each memory operation specifier, the memory system checks to determine whether the current subject can perform the operation specified in the memory command on data contained in the object specified by the logical address. If the current subject cannot, the memory system does not perform the operation.

The processor includes instruction decoding apparatus, logical address generating apparatus which generates logical addresses, and control apparatus for controlling the processor in response to signals from the other components and the memory system and providing memory commands to the memory system. The logical address generation apparatus generates a logical address for a data item represented by a name by performing a resolve operation on the name. In that operation, the logical address generator derives the logical address as specified in the name table entry corresponding to the name. The logical address generation hardware also generates the logical address of the next instruction to be executed.

Execution of an instruction by the processor proceeds as follows: The logical address generator generates the address of the next instruction, and the processor outputs a memory command containing that address to the memory system. The memory system then outputs the instruction to the processor. The instruction decoder decodes the operation code, and in response to the instruction decoder, the control apparatus causes the logical address generation apparatus to resolve the names in the instruction. The processor produces a memory operation specifier for data by outputting the logical address produced by the logical address generation apparatus together with a memory command produced by the control apparatus.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is a further object of the present invention to provide an improved information protection mechanism.

It is still another object of the present invention to provide a simplified and flexible user interface to a data processing system.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of of ordinary skill in the art, after referring to the following detailed description of the preferred embodiments and drawings wherein:

Figure 1:
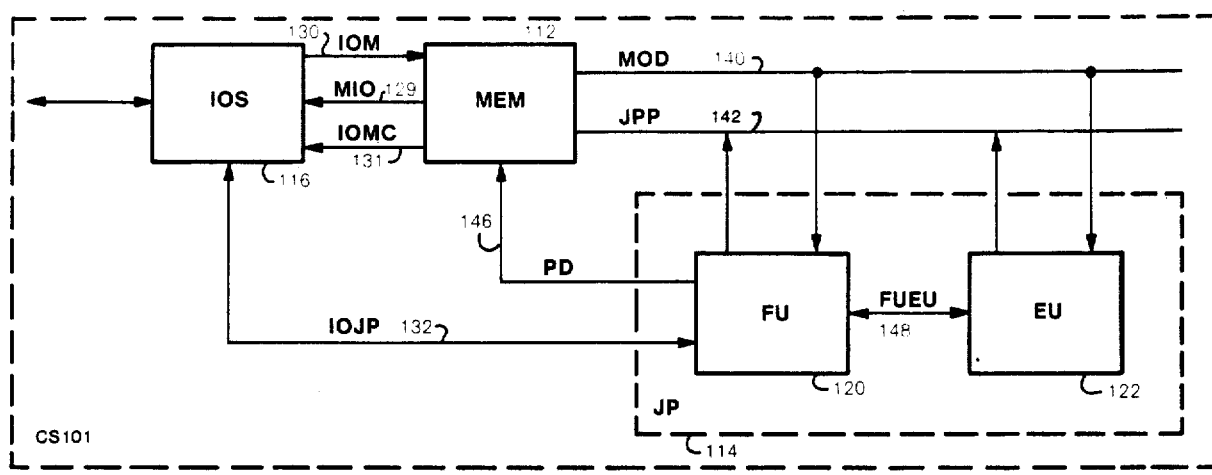
FIG. 1 is a partial block diagram of a computer system incorporating the present invention.
Figure 2:
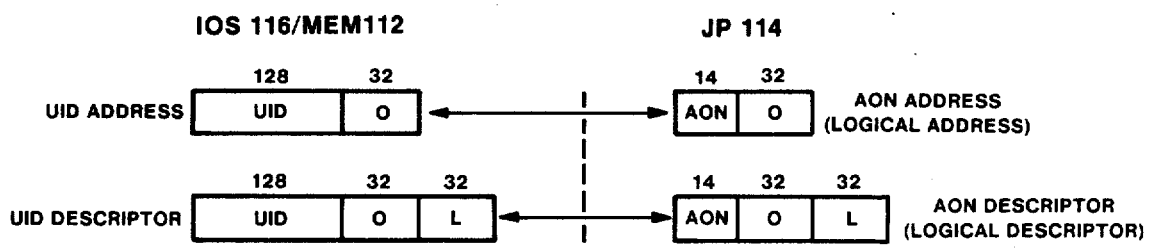
Figure 2:
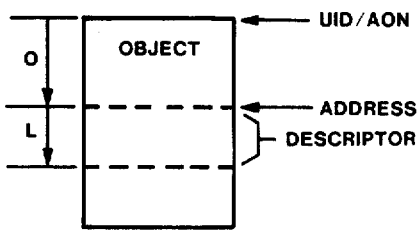
Figure 3:
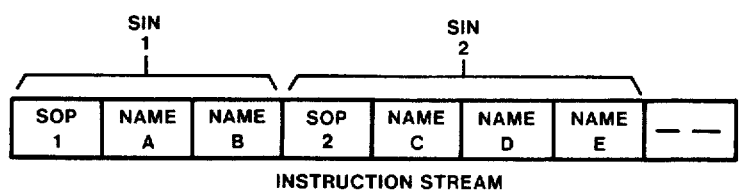

This application incorporates by reference the entire application, Ser. No. 266,402, filed on May 22, 1981, of Baxter et al., now issued as U.S. Pat. No. 4,455,602, on June 19, 1984.

What is claimed is:

1. A digital computer system comprising:
   memory means for storing and providing data items, said data items including instructions,
   memory organization means operative on said memory means for organizing said memory means into objects which provide for the location of said data items in said memory means, each object being identifiable by an object identifier;
   access control means for identifying for each object a set of subjects which are permitted to access the data items in said object and for identifying for each subject a specified set of memory operations which each said subject is permitting to perform;
   means responsive to said access control means and to a request from a current subject for access to a current data item in an object and for the performance of a current memory operation for determining whether said current subject is a subject which is permitted to access said current data item and whether said current memory operation is one which said current subject is permitted to perform;

memory oepration means responsive to a memory operation specifier which includes
- a logical address specifying an object identifier and a location in the object identified by said object identifier, and
- a memory command specifying a current memory operation, and further responsive to a request from a current subject for performing a current memory operation specified by said memory command when said determining means determines that said current subject is one having permission to access the object specified by said logical address and to perform said current memory operation, and further wherein said instructions include
- operation codes specifying operations, including memory operations, of said digital computer system, certain instructions further including
- a name representing a data item to be used in an operation specified by an operation code, and said system further includes
- means for storing a plurality of name table entries each name table entry corresponding to a data item and to the name representing said data item and each name table entry including information from which the logical address of the data item represented by the name corresponding to said name table entry can be derived, and
- processor means connected to said memory means and including
- means for providing instructions from said memory means,
- instruction decoding means responsive to instructions from said instruction providing means for decoding a current instruction to provide one or more names therein,
- logical address generation means responsive to the information in a name table entry corresponding to a name for deriving a logical address from said information, said logical address generating means including
- name resolution means responsive to a name in said decoded instruction and to the information in the name table entry corresponding to said name for generating the logical address for the data item represented by said name, and
- next instruction address generation means further responsive to said decoded instruction for providing a logical address of a next current instruction, and
- control means responsive to a name from said instruction decoding means and to the logical address from said logical address generation means for providing a representation of a current subject and one or more memory operation specifiers to said memory operation means.

2. In the digital computer system of claim 1 wherein said memory means is a local memory means and said system further includes global memory means for storing data items belonging to said objects, said local memory means being connected between said processor means and said global memory means and including
- means for obtaining copies of data items from said global memory means;
- said memory operation means being responsive to memory operation specifiers and to current subjects and to copies of data items from said global memory means for providing modified copies of said data items to said global memory means; and
- said memory operation means being further responsive to a memory operation specifier and to a current subject for performing the memory operation specified in the memory operation specifier for the modified copy of the data item specified by said logical address generating means when the current subject is a specified subject and the memory operation is a specified memory operation;
- said memory organization means further includes a logical allocation unit directory for said global memory means, said directory including a plurality of logical allocation unit directory entry items for defining objects, each said logical allocation unit directory entry item including
- an object identifier item having a value which specifies the object defined by said logical allocation unit directory entry item,
- an access control list item specifying a set of subjects which are permitted access to said defined object and the set of memory operations for each said subject, and
- a data location item specifying the location of data items belonging to said defined object in said global memory;

and further wherein said objects include
- procedure objects containing procedure data items and each said procedure object including
  - a procedure including instructions, and
    - a name table which is a part of said name table entires storing means and is associated with said procedure, said name table containing name table entires corresponding to the names in certain instructions of said procedure, and
- data objects containing data items other than those contained in said procedure objects; and said local memory means includes
- an access control table accessible by means of object identifiers, containing copies of the access control list items for all the objects from which data items have been copied into said local memory means,
- a local memory control table accessible by means of logical addresses for indicating whether a copy of a data item specified by a logical address is present in said local memory and the location of said data item copy in said local memory,
- virtual memory management means responsive to logical addresses and to said local memory control table for translating a global logical address specifying the location of a data item in said global memory means into a local logical address specifying the location of a copy of said data item in said local memory means when said local memory control table indicates that said copy is present in said local memory means and otherwise determining the location of said data item in said global memory means by means of a said global logical address and said logical allocation unit directory and fetching a copy of said data item from said global memory means when said local memory control table indicates that said copy is not present in said local memory means, and
- access checking means responsive to a memory operation specifier and to the access control table of said local memory means for providing copies of access control list items therein and further responsive to a representation of the current subject received from said processor means and to a representation of the object identifier and the memory command specified in said memory operation specifier for inhibiting said local memory means from performing the memory operation specified by said memory operation specifier unless the copy of said access control list item for the object specified by the representation of said object identifier indicates that the current subject is a specified subject and that the memory operation specified by said memory command is a specified memory operation; and said processor means includes private memory means accessible only to said processor means and under control of said control means, said private memory means containing the representation of said current subject.

3. In the digital computer system of claim 2 wherein each object identifier is different from each other object identifier and each object is uniquely identified by the object identifier associated with said object.

4. In the digital computer system of claim 2 wherein said processor means includes a first plurality of processor means, and said local memory means includes a plurality of local memory means connected between said global memory means and said first plurality of processor means.

5. In the digital computer system of claim 2 wherein each operation code in said instructions belongs to a set of operation codes of a plurality of sets thereof; and all operation codes in a single procedure belong to the same operation code set and said procedure has associated with it an operation code set identifier specifying said operation code set; and said private memory means contains a dialect value representing the operation code set identifier for the procedure currently being executed; and said instruction decoding means and said control means are responsive to all of said operation code sets and respond to the instruction currently being executed as determined by the operation code in said instruction and the value representing said operation code set identifier.

6. In the digital computer system of claim 2, and wherein:

each said instruction code in said instructions belongs to one set of instruction codes of a plurality of sets of said instruction codes;

all said instruction codes in a single said procedure item belong to the same instruction code set and said procedure item has associated with it an instruction code set identifier specifying said instruction code set;

said private memory contains a dialect value representing said instruction code set identifier for said procedure currently being executed; and said instruction decoding means and said control means are responsive to all of said operation code sets and respond to said instruction currently being executed as determined by said operation code in said instruction and said value representing said instruction code set identifier.

7. In the digital computer system of claim 6 wherein each operation code set includes a call operation code specifying a call operation for suspending execution of the procedure currently being executed by said processor means, for locating another procedure, for setting a dialect value to specify an operation code set for said another procedure, and for beginning the execution of said suspended another procedure;

each operation code set further includes a return operation code specifying a return operation for terminating the execution of the procedure currently being executed, for locating the procedure whose execution was suspended, for setting a dialect value to specify the operation code set for the suspended procedure whose execution is being resumed, and for resuming said suspended execution; and said processor means sets said dialect value only in response to said call operation code and said return operation code.

8. In the digital computer system of claim 6, wherein all operation codes have the same size and all names in a procedure have the same size.

9. In the digital computer system of claim 2, wherein each logical allocation unit directory entry item contains a size attribute specifying the current size of said defined object;

said access control table further contains a copy of said size attribute for each object having copies of data items in said local memory means;

said logical address generation means provides a logical descriptor containing a logical address and a length specifier to said local memory means;

said name table entry item corresponding to a name further specifies how the length of a data item represented by said name is to be derived;

said name resolution means further derives the length specifier specified by the name table entry corresponding to said name;

said memory operation specifier further includes a logical descriptor and said local memory means responds to said logical descriptor by providing the data item at the location specified by the representation of said object identifier and said offset and having the length specified by said length specifier; and said access checking means further provides a copy of the size attribute in said access control table and inhibits said local memory means from performing the memory operation specified by said memory operation specifier when the data item specified by said logical address and said length specifier extends beyond the end of the object as specified by said size attribute.

10. In the digital computer system of claim 9 wherein said size attribute specifies a size which may be any number of bits up to the maximum size of said object; and said length specifier specifies any number of bits.

11. In the digital computer system of claim 2 wherein each execution of a procedure by said processor means has associated with it a set of data objects accessible by the subject executing said procedure;

said private memory means includes a set of architectural base addresses specifying the logical addresses of locations in the set of data objects associated with the procedure currently being executed by said processor means;

said name table entry item specifies the manner in which said processor means is to derive the logical address of a data item represented by the name corresponding to said name table entry item by specifying an architectural base address and a displacement from the location specified by said architectural base address; and said name resolution means uses said specified architectural base address and said specified displacement to derive the logical address for the data item represented by said name.

12. In the digital computer system of claim 2 wherein data items include pointer items whose value includes an object identifier and an offset; and said logical address generation means further includes pointer to logical address conversion means for converting the pointer item received from said local memory means to the logical address containing the representation of the object identifier contained in said pointer item and the offset contained in said pointer item, and logical address to pointer conversion means for converting said logical address to the pointer item containing the object identifier corresponding to the representation in said logical address and the offset in said logical address and for providing said pointer item to said local memory means, whereby said processor means may obtain the logical addresses of said data items from said pointer items and may form said pointer items from the logical addresses of said data items.

13. In the digital computer system of claim 12 wherein the offset in said logical address may specify any bit in the object specified by the representation of said object identifier, and the offset in said pointer item may specify any bit in the object specified by the object identifier in said pointer item.

14. In the digital computer system of claim 2 wherein the logical allocation unit director entry for said procedure object includes a domain of execution attribute;

the current subject includes the domain of execution attribute for the procedure object containing the procedure currently being executed by said processor means; and said instructions include a call instruction specifying a call operation for suspending the execution of a procedure currently being executed by said processor means, for locating another procedure, if said another procedure is in another procedure object, for setting the representation of said current subject to represent the subject containing the domain of execution attribute for said another procedure object, and for beginning the execution of said another procedure, and a return instruction specifying a return operation for terminating the execution of the procedure currently being executed, for locating the procedure whose execution was suspended, if said suspended procedure is in a different procedure object, for setting the representation of the current subject to represent the subject containing the domain of execution attribute for said different procedure object, and for resuming said suspended execution; and said processor means sets the representation of said current subject only in response to a call instruction and a return instruction.

15. In the digital computer system of claim 14 wherein objects include stack objects containing frame items of data, each frame item being associated with the execution of a procedure item which has not yet terminated;

said processor means response to a call instruction by providing the frame item for the procedure whose execution is being commenced in the stack object having the access control list entry item allowing the subject resulting from said call operation to access said frame item; and said processor means response to a return instruction by locating the frame associated with the suspended execution being resumed by said return instruction.

16. In the digital computer system of claim 2 wherein said private memory means further includes a name table logical address specifying the name table associated with the procedure currently being executed;

said instructions include a call instruction specifying a call operation for suspending the execution of the procedure currently being executed by said processor means, for locating another procedure, if said another procedure is associated with a different name table from that associated with the procedure currently being executed, for changing the name table logical address to specify the name table associated with said another procedure, and for beginning the execution of said another procedure, and a return instruction specifying a return operation for terminating the execution of the procedure currently being executed, for locating the procedure whose execution was suspended. If said suspended procedure is associated with a name table different from the name table associated with the procedure whose execution is being terminated, for changing the name table logical address to specify the name table associated with said suspended procedure, and for resuming said suspended execution; and said processor means sets the name table logical address only in response to a call instruction and a return instruction.

* * * * *